United States Patent
Cole et al.

(10) Patent No.: US 9,423,503 B2
(45) Date of Patent: Aug. 23, 2016

(54) BOREPATH ANALYZER

(71) Applicant: The Charles Machine Works, Inc., Perry, OK (US)

(72) Inventors: Scott B. Cole, Edmond, OK (US); Brian J. Schrock, Guthrie, OK (US)

(73) Assignee: The Charles Machine Works, Inc., Perry, OK (US)

( * ) Notice: Subject to any disclaimer, the term of this patent is extended or adjusted under 35 U.S.C. 154(b) by 146 days.

(21) Appl. No.: 14/087,673

(22) Filed: Nov. 22, 2013

(65) Prior Publication Data

US 2014/0144704 A1      May 29, 2014

Related U.S. Application Data

(60) Provisional application No. 61/731,277, filed on Nov. 29, 2012.

(51) Int. Cl.
| | |
|---|---|
| *G01V 3/00* | (2006.01) |
| *G01S 19/13* | (2010.01) |
| *E21B 7/04* | (2006.01) |
| *E21B 47/09* | (2012.01) |
| *G01S 5/02* | (2010.01) |
| *G01V 3/12* | (2006.01) |
| *G01V 3/15* | (2006.01) |

(52) U.S. Cl.
CPC .............. *G01S 19/13* (2013.01); *E21B 7/046* (2013.01); *E21B 47/09* (2013.01); *G01S 5/02* (2013.01); *G01V 3/12* (2013.01); *G01V 3/15* (2013.01)

(58) Field of Classification Search
CPC ......... G01V 3/12; G01V 3/15; G01V 11/002; E21B 47/09; E21B 47/12; E21B 47/046; E21B 47/02; E21B 47/024; E21B 47/02224

USPC ....................................................... 340/853.1
See application file for complete search history.

(56) References Cited

U.S. PATENT DOCUMENTS

| | | | |
|---|---|---|---|
| 5,904,210 A * | 5/1999 | Stump et al. .................... 175/45 |
| 6,496,008 B1 * | 12/2002 | Brune ................... E21B 47/024 |
| | | | 175/45 |
| 8,264,226 B1 * | 9/2012 | Olsson ..................... G01V 3/15 |
| | | | 324/326 |
| 8,497,684 B2 * | 7/2013 | Cole ................. E21B 47/02224 |
| | | | 324/326 |
| 8,729,901 B2 | 5/2014 | Lam et al. |
| 2002/0105331 A1 * | 8/2002 | Brune et al. .................. 324/326 |
| 2005/0023036 A1 * | 2/2005 | Cole et al. ....................... 175/26 |
| 2005/0077085 A1 * | 4/2005 | Zeller .............. E21B 47/02224 |
| | | | 175/45 |

(Continued)

*Primary Examiner* — Firmin Backer
*Assistant Examiner* — Adnan Aziz
(74) *Attorney, Agent, or Firm* — Tomlinson Rust McKinstry Grable

(57) ABSTRACT

A tracker used to analyze a desired borepath prior to horizontal directional drilling operations. The tracker analyzes an amount of interference present at a plurality of different frequencies at multiple locations along the borepath and maps a plot of the interference at the different frequencies. The lower the point on the plot, the less interference present at that frequency at the location analyzed. The tracker summarizes the overall interference along the desired borepath for the different frequencies analyzed and will recommend a preferred frequency. An operator may program the beacon prior to boring operations to emit a beacon signal at the preferred frequency. The operator may also tune the tracker to receive the preferred frequency. The tracker and beacon may then communicate during boring operations at the preferred frequency in order to detect the position of the beacon underground relative to the tracker.

23 Claims, 4 Drawing Sheets

(56) References Cited

U.S. PATENT DOCUMENTS

| | | | |
|---|---|---|---|
| 2006/0254820 A1* | 11/2006 | Cole et al. | 175/45 |
| 2008/0036652 A1* | 2/2008 | Shore | E21B 47/02224 342/357.31 |
| 2011/0001633 A1* | 1/2011 | Lam et al. | 340/853.1 |

* cited by examiner

BOREPATH ANALYZER

CROSS REFERENCE TO RELATED APPLICATION

This application claims the benefit of provisional patent application Ser. No. 61/731,277, filed on Nov. 29, 2012, the entire contents of which are incorporated herein by reference.

FIELD

The present invention relates generally to the field of locating underground objects, and in particular to locating and tracking a beacon within the field of operation of a horizontal drilling machine.

SUMMARY

The present invention is directed to a method for tracking a beacon. The method comprises the steps of placing a tracker at a first location, measuring an amount of interference present at each of a plurality of different frequencies at the first location, and determining a preferred frequency based on the amount of interference. The method further comprises the steps of programming the beacon to emit a beacon signal at the preferred frequency, placing the beacon below ground, and determining a location of the beacon relative to the tracker by detecting the beacon signal at the preferred frequency.

The present invention is also directed to a method for analyzing a plurality of different frequencies present along a borepath. The method comprises the steps of measuring an amount of interference at each of the plurality of different frequencies at a first location using a tracker, measuring the amount of interference present at each of the plurality of different frequencies at a second location using the tracker, averaging the amount of interference present at each of the plurality of different frequencies at the first location and at the second location in order to determine a preferred frequency to tune the tracker to during a horizontal drilling operation, and tuning the tracker to the preferred frequency during the horizontal drilling operation.

The present invention is also directed to a tracker for locating a beacon. The tracker comprises a first antenna to detect a beacon signal at a plurality of different frequencies, and a processor configured to determine a preferred frequency based on a summary of interference present at each of the plurality of different frequencies. The processor is also configured to tune the antenna to the preferred frequency. The beacon emits the beacon signal at the preferred frequency, and the processor is adapted to process the beacon signal emitted at the preferred frequency detected by the first antenna and determine a location of the beacon relative to the tracker.

The present invention is further directed to a horizontal boring system. The system comprises a rotary drilling machine, a drill string, a downhole tool, and a tracker. The drill string has a first end and a second end, the first end is operatively connectable to the rotary machine to drive rotation of the drill string. The second end of the drill string is connected to the downhole tool. The downhole tool comprises a beacon that emits a beacon signal at a plurality of different frequencies. The tracker is used for location of the beacon. The tracker comprises a first antenna to detect the beacon signal, and a processor configured to determine a preferred frequency for the beacon signal based on a summary of interference present at each of the plurality of different frequencies. The processor is adapted to process the beacon signal detected by the first antenna and determine a location of the beacon relative to the tracker.

DESCRIPTION

The horizontal directional drilling industry traditionally uses walkover tracking techniques to follow the progress of a bore, to find the surface location immediately above the drill bit, and to determine the depth of the drill bit from that surface location. The primary tracking tools are a subsurface transmitter, also called a beacon, and a hand-carried surface receiver assembly. The beacon, located in or very near a downhole boring tool, generally emits a beacon signal at a specific frequency. The beacon signal can be used for both location and communication with the above ground receiver assembly. However, there may be instances where interference from outside sources emitting signals interrupts this communication.

Figure 1:
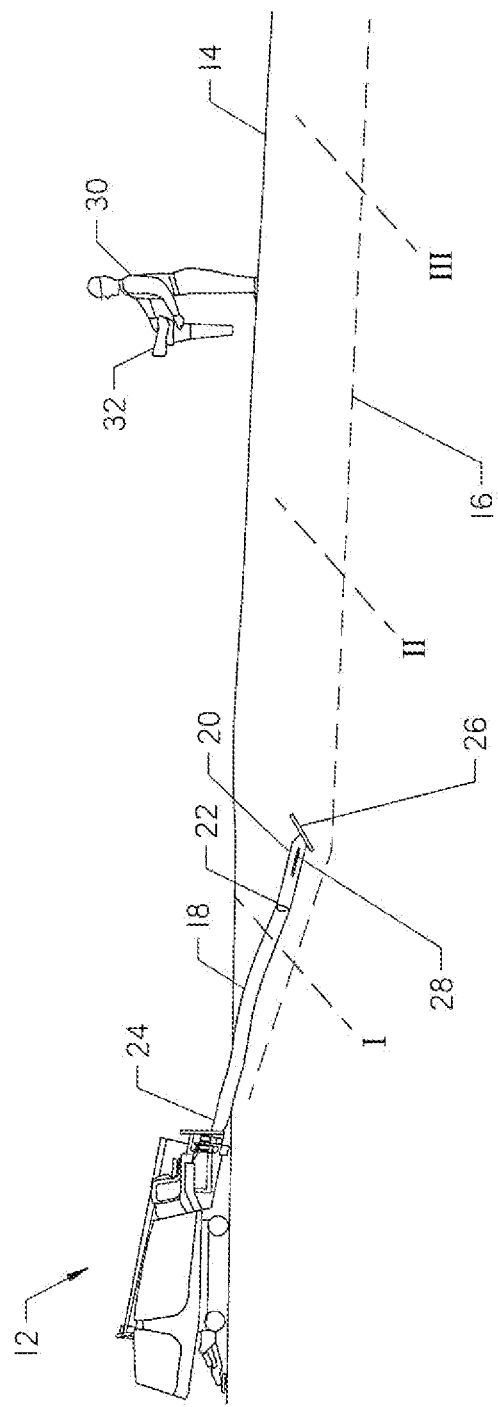
FIG. 1 is an illustration of a horizontal directional drilling system for drilling a horizontal borehole and a tracking system built in accordance with the present invention.

Turning now to the figures, and first to FIG. 1, a horizontal directional drilling system for use with the present invention is shown. FIG. 1 illustrates a boring machine 12 sitting on the ground surface 14. FIG. 1 also illustrates a desired borepath 16. A drill string 18 is shown connected to a downhole tool 20 at a first end 22 and the boring machine 12 at a second end 24. The downhole tool 20 comprises a drill bit 26 and a beacon 28. In operation, the drill bit 26 will bore underground and advance the downhole tool 20 and drill string 18 forward along the desired borepath 16. The boring machine 12 will add a plurality of pipe sections to the drill string 18 as the downhole tool 20 advances farther along the desired borepath 16.

Continuing with FIG. 1, an operator 30 holding a tracker 32 is also shown. During boring operations, the beacon 28 contained within the downhole tool 20 will emit a beacon signal (not shown) at a designated frequency. The tracker 32 is adapted to receive the beacon signal and determine the location of the downhole tool 20 underground relative to the tracker. Based on the determined location of the downhole tool 20 underground, the operator 30 can determine whether or not the downhole tool is boring along the desired borepath 16 or if steering corrections need to be made.

Figure 2:
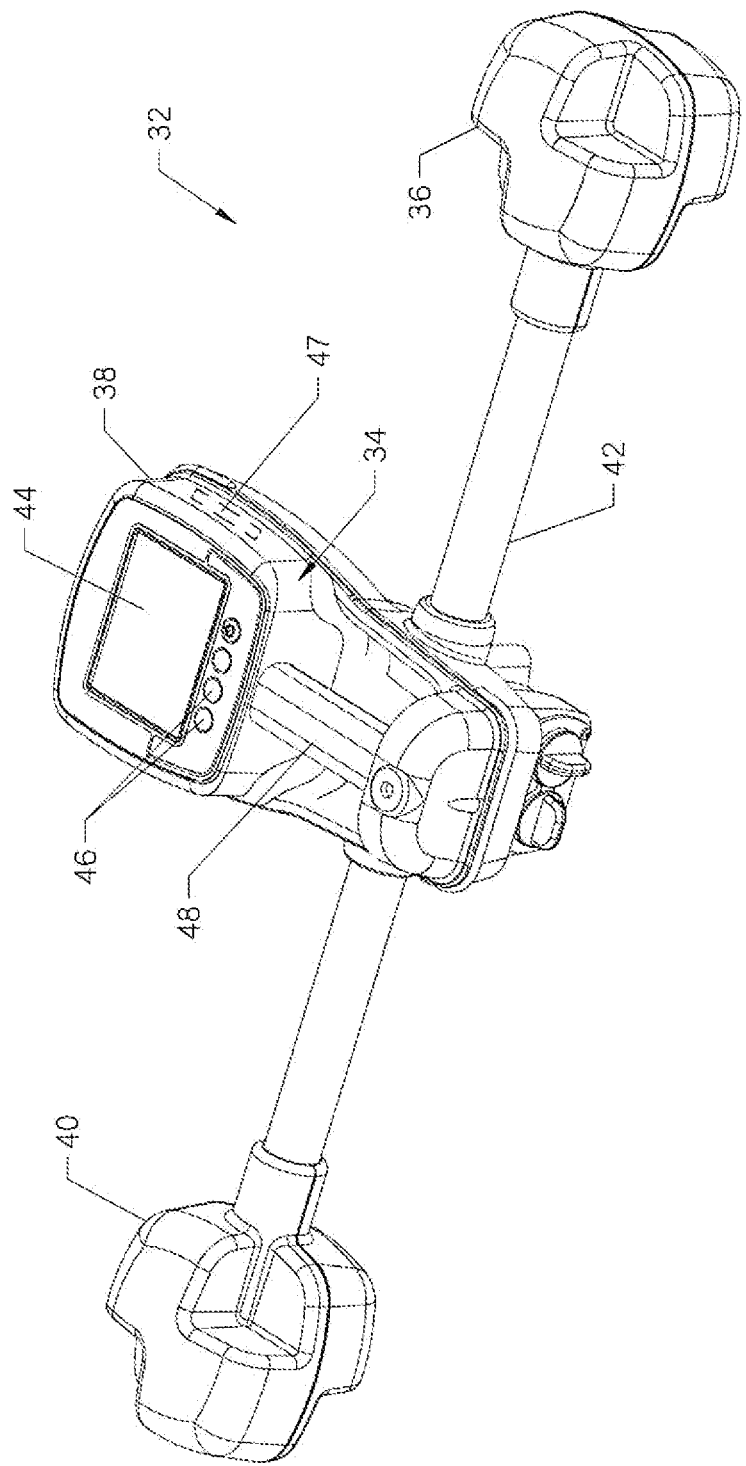
FIG. 2 is a perspective view of a tracker constructed in accordance with the present invention.

Turning now to FIG. 2, the tracker 32 is shown in greater detail. The tracker 32 comprises a receiver assembly 34 and a first antenna 36. The receiver assembly 34 comprises a housing 38. The tracker 32 may also comprise a second antenna 40 and a third antenna (not shown). The antennas 36 and 40 may be spaced apart on a horizontal frame 42, as shown in FIG. 2, or the antennas may be in a vertical plane with the receiver assembly 34, as shown in FIG. 1. The housing 38 comprises a visual display 44 and a plurality of input devices 46. A processor 47 may be disposed within the housing 38. The receiver assembly 34 may also comprise a handle 48.

The antennas 36 and 40 shown in FIG. 2 are adapted to detect the beacon signal emitted from the beacon 28 (FIG. 1) at the designated frequency. Once the antennas 36 and 40 detect the beacon signal, they send an antenna signal (not shown) to the receiver assembly 34. The processor 47 of the receiver assembly 34 interprets the antenna signal and identifies the location of the beacon 28 (FIG. 1) underground relative to the receiver assembly. The beacon 28 is capable of emitting the beacon signal at a plurality of different frequencies. Similarly, the antennas 36 and 40 are capable of detecting the beacon signal at the plurality of different frequencies. For example, the beacon 28 may transmit the beacon signal at 1,000 Hz, 2,000 Hz, 3,000 Hz, or 30,000 Hz, depending on which frequency the operator 30 has programmed the beacon to emit.

The antennas 36 and 40 are also adapted to detect alternative magnetic field sources being emitted at one of the plurality of different frequencies within range of the tracker 32. Objects emitting magnetic field sources within range of the tracker 32, such as power lines, gas lines, railroads, etc., may interrupt the communication between the beacon 28 and the tracker. This interruption is referred to as interference. The amount of interference present at the different frequencies may vary depending on what frequency the alternative magnetic field source is emitting its signal. One frequency may have a much greater amount of interference present while a second frequency may have a much lower amount of interference present. The lower the amount of interference present, the more effectively the tracker 32 can communicate with the beacon 28. Thus, one frequency may be more effective than other frequencies at certain locations along the desired borepath 16 for the beacon 28 and the tracker 32 to communicate during drilling operations. Based on this, the tracker 32 of the present invention is configured to analyze the amount of interference present at the plurality of different frequencies along the course of the desired borepath 16 prior to starting boring operations and determine the preferred frequency at which the beacon 28 (FIG. 1) should communicate with the tracker 32.

Turning back to FIG. 1, to analyze the borepath, the operator 30 must first ensure that there are no beacons 28 on in the area to disrupt the interference analysis. The tracker 32 is then placed in "analyze mode." This may be initiated by pressing one of the input devices 46 on the tracker 32 (FIG. 2). The operator 30 will start by analyzing a first location (I) along the desired borepath 16. To do this, the operator 30 holds the tracker 32 over the first location (I) and tells the tracker to analyze the first position (I). This may be initiated by pressing one of the input devices 46 on the tracker 32. The tracker 32 will then measure a type of interference and an amount of noise at each of the plurality of different frequencies present and selected to be analyzed at the first location (I), such as 1,000 Hz, 2,000 Hz, 3,000 Hz, or 30,000 Hz frequencies.

Figure 3:
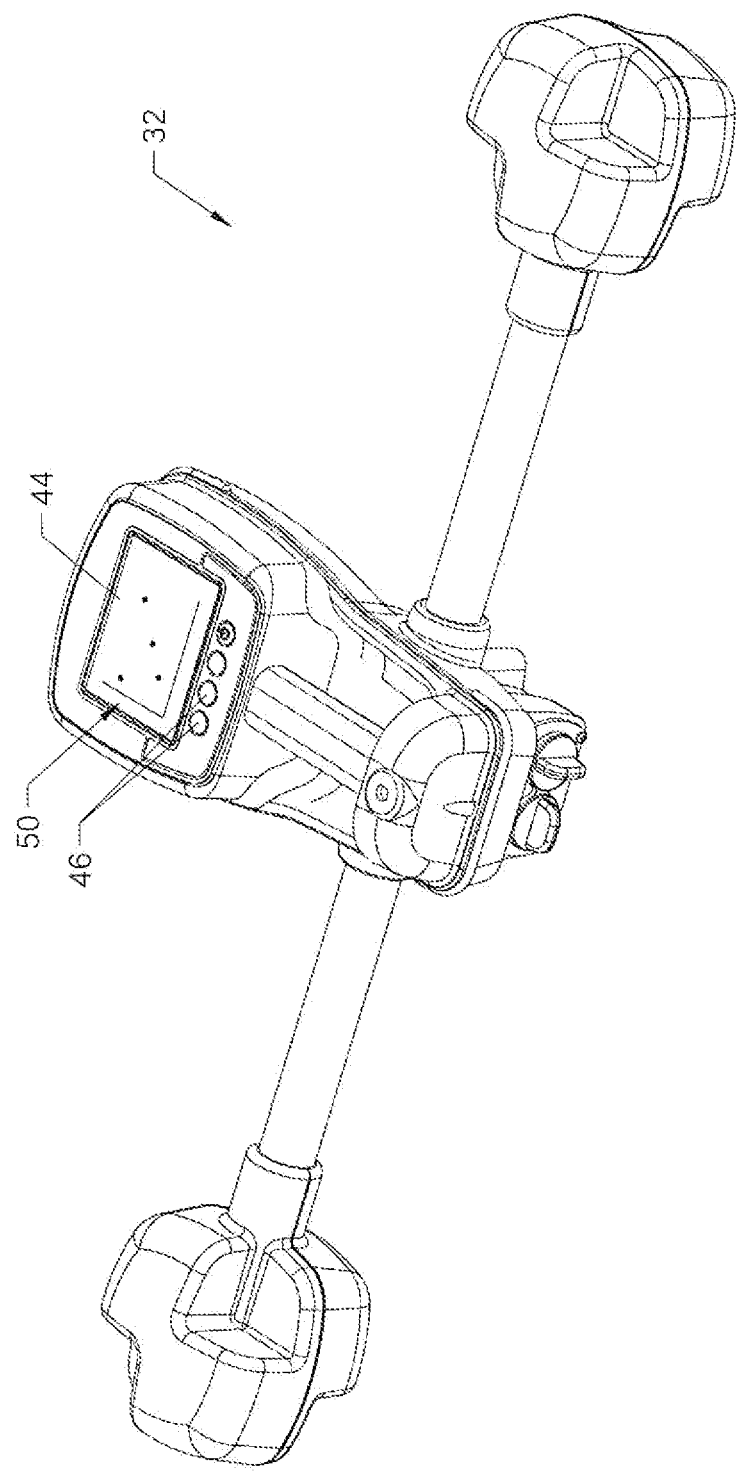
FIG. 3 is a perspective view of the tracker exemplifying a plot formed on a visual display on the tracker in accordance with the present invention.

Referring now to FIG. 3, once the operator 30 begins analyzing the first location (I) (FIG. 1), a plot 50 may begin on the visual display 44 of the tracker 32 indicating the interference or relative noise floors present at the plurality of different frequencies analyzed. The lower a point on the plot 50 for a specific frequency, the deeper that frequency can be detected without interference. The most effective frequency or frequencies to emit the beacon signal during boring can be determined by the lowest points on the plot 50. Once the operator 30 is done analyzing the first location (I), the operator may move and perform the same analysis on a second location (II) and a third location (III) (FIG. 1). The operator 30 may analyze as many locations as needed along the desired borepath 16. The plot 50 will be created at each location analyzed along the borepath 16. The analysis of the multiple locations will be stored within the processor 47 (FIG. 2) of the tracker 32 along with the GPS coordinates of the multiple locations. The required power level to complete the analysis of the entire desired borepath 16 may not be known by the tracker 32. Prior to analyzing, the operator 30 may select the appropriate power level for the analysis based on the job requirements.

Referring now to both FIGS. 1 and 3, once the operator 30 has finished measuring the interference present along the desired borepath 16 using the tracker 32, the operator may tell the tracker 32 to summarize the amount of interference present at the different frequencies for the entire borepath. This may be initiated by pressing one of the input devices 46 on the tracker 32. The summary provides the operator 30 with the average amount of interference for each frequency measured along the entire borepath and provides the operator with the recommended frequency at which to emit the beacon signal from the beacon 28 and to tune the tracker 32 to during horizontal drilling operations. Since the amount of interference may vary at different locations along the borepath 16, the summary may recommend more than one frequency to use during drilling operations. The operator 30 may determine the preferred frequency or frequencies based on the provided recommendation. However, the preferred frequency may vary from the recommended frequency or frequencies based on the specific needs of the boring operation. After forming the summary of interference, the tracker 32 may also recommend one of a plurality of different digital modulation schemes, such as OOK, FSK, PSK, etc., to operate on based on the amount of interference at each of the plurality of different frequencies.

Continuing with FIG. 1, the beacon 28 may be programmed to emit only one preferred frequency during the entire boring operation, or if using a multiple frequency beacon, the beacon may be programmed to emit two or more different preferred frequencies while boring. However, the beacon 28 may only emit one of the two or more preferred frequencies at a time. Therefore, the operator 30 may toggle back and forth between the different frequencies depending on which frequency is preferred at certain locations along the borepath 16. The beacon 28 may be manually set to emit the preferred frequency or frequencies prior to boring operations or it may be set using Bluetooth prior to boring operations if the beacon is capable of Bluetooth communication. Once the beacon 28 is programmed, the beacon, along with the downhole tool 20, may be placed underground and boring operations may begin.

Figure 4:
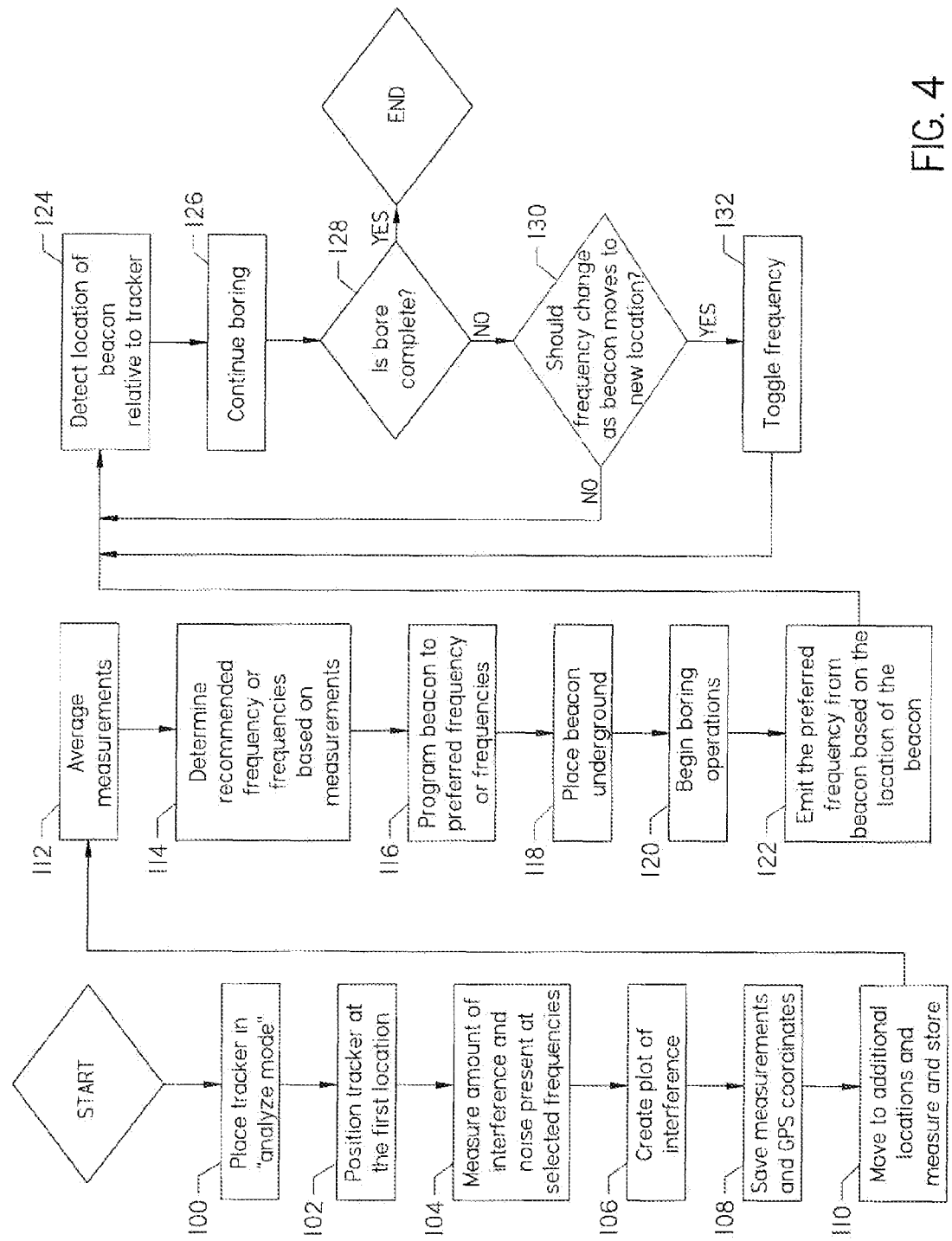
FIG. 4 is a flowchart depicting a method to analyze a desired borepath in accordance with the present invention.

Turning now to FIG. 4, a flowchart depicting a method to analyze the desired borepath 16 is shown. To start, the operator 30 will place the tracker 32 in "analyze mode" by pressing one of the input devices 46 on the tracker (step 100). The operator 30 will then analyze the first location (I) by holding the tracker 32 over the first location (I) and pressing one of the input devices 46 to initiate the analysis (step 102). The tracker 32 will analyze the first location (I) by measuring the amount of interference and noise present at each of the selected frequencies at the first location (I) (step 104). Following this analysis, the tracker 32 will create a plot 50 on the visual display 44 identifying the amount of interference present at the selected frequencies at the first location (I) (step 106). The tracker 32 will save this data along with the GPS coordinates of the first location (I) (step 108).

Continuing with FIG. 4, the operator 30 will analyze as many additional locations along the desired borepath 16 as necessary by repeating steps 102 through 108 at each additional location (step 110). The tracker 32 will then average all of the data collected and create a summary of interference (step 112). The tracker 32 will then provide the operator 30 with the recommended frequency or frequencies at which to emit the beacon signal and to tune the tracker to during horizontal drilling operations; the operator 30 will then determine the preferred frequency or frequencies based on the recommended frequency (step 114).

After the operator 30 determines the preferred frequency or frequencies, the operator will program the beacon 28 to emit the preferred frequency or frequencies (step 116). The beacon 28 is then placed underground (step 118) and the boring machine 12 may begin boring operations (step 120). While boring, the beacon 28 will emit the preferred frequency based on the preferred frequency at the location of the beacon (step 122). Once the beacon 28 emits the preferred frequency, the operator 30 may detect the location of the beacon relative to the tracker 32 (step 124). After locating the beacon 28, the operator 30 will ensure that the downhole tool 20 is continuing along the desired borepath 16 and if necessary, the operator 30 will make steering corrections before continuing to bore (step 126). The operator 30 may continue detecting the beacon 28 at the preferred frequency until boring of the desired borepath 16 is complete (step 128).

Prior to completing boring operations, the operator 30 will determine if a second or different frequency is preferred to detect the beacon 28 as the beacon moves to a new location along the desired borepath 16 (step 130). If the second frequency is not preferred at the new location, the operator 30 will continue detecting the beacon signal at the original preferred frequency while boring operations continue (steps 126 and 124). If the second frequency is preferred, the operator 30 will change the beacon 28 to emit the second preferred frequency. The operator 30 will then detect the beacon 28 relative to the tracker 32 using the second preferred frequency while boring operations continue. The operator 30 will toggle between the different preferred frequencies as needed until boring operations are completed (step 132). The operator 30 may perform step 130 as many times as needed along the desired borepath 16.

The present invention provides a tracking system with the ability to analyze the different frequencies the beacon is capable of emitting and determine which frequency has the least amount of interference present at certain locations along the borepath.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

What is claimed is:

1. A method for tracking a beacon along a desired borepath, the method comprising:
    measuring an amount of interference present at each of a plurality of different frequencies at a first and a second location, along the desired borepath, with a tracker to determine a noise floor for each of the plurality of frequencies at the first and second locations;
    selecting a first preferred frequency at which to emit a beacon signal at the first location based on the desired borepath, the noise floor for each of the plurality of frequencies measured at the first location, and an amount of power required to emit the first preferred frequency at the first location;
    selecting a second preferred frequency at which to emit the beacon signal at the second location based on the desired borepath, the noise floor for each of the plurality of frequencies measured at the second location, and an amount of power required to emit the second preferred frequency at the second location;
    configuring the beacon to emit the beacon signal at the first preferred frequency and power level when the beacon is at the first location and to emit the beacon signal at the second preferred frequency and power level when the beacon is at the second location;
    moving the beacon below ground from the first location to the second location during a horizontal boring operation;
    determining a position of the beacon relative to the tracker by detecting the beacon signal at the first preferred frequency proximate the first location; and
    determining a second position of the beacon relative to the tracker by detecting the beacon signal at the second preferred frequency proximate the second location.

2. The method of claim 1 wherein the amount of interference comprises a type and an amount of noise present at each of the plurality of different frequencies at the first location and at the second location.

3. The method of claim 1 further comprising:
    averaging the amount of interference present at each of the plurality of different frequencies at the first location and at the second location in order to determine an average amount of interference.

4. The method of claim 1 further comprising determining the second preferred frequency to be the same frequency as the first preferred frequency.

5. The method of claim 1 further comprising placing the tracker at a plurality of locations along a borepath and analyzing the amount of interference present at each of the plurality of different frequencies present at each of the plurality of locations.

6. The method of claim 5 further comprising averaging the amount of interference at each of the plurality of different frequencies at the plurality of locations in order to determine the average amount of interference.

7. The method of claim 1 further comprising recommending one of a plurality of different digital modulation schemes based on the amount of interference at each of the plurality of different frequencies.

8. The method of claim 1 further comprising setting the tracker in an analyze mode before measuring the interference at the first location.

9. A method for tracking a beacon below ground along a desired borepath, the method comprising the steps of:
    measuring an amount of interference at each of a plurality of different frequencies at a first location and at a second location using a tracker to determine a noise floor for each of the plurality of frequencies at the first and second location;
    creating a plot of the noise floor for each of the plurality of frequencies measured at the first and second location using a processor included in the tracker;
    selecting a first preferred frequency at which to emit a beacon signal at the first location based on the desired borepath, the plot at the first location, and a power level to emit the first preferred frequency;
    selecting a second preferred frequency at which to emit the beacon signal at the second location based on the desired borepath, the plot at the second location, and a power level to emit the second preferred frequency;

configuring the beacon to emit the beacon signal at the first preferred frequency and power level when the beacon is at the first location and to emit the beacon signal at a second preferred frequency and power level when the beacon is at the second location;

moving the beacon below ground from the first location to the second location during a horizontal boring operation; and determining a first position of the beacon relative to the tracker by detecting the beacon signal at the first preferred frequency and subsequently determining a second position of the beacon relative to the tracker by detecting the beacon signal at the second preferred frequency.

10. The method of claim 9 wherein the amount of interference comprises a type and an amount of noise present at each of the plurality of different frequencies.

11. The method of claim 9 further comprising measuring the amount of interference present at each of the plurality of different frequencies at a third location using the tracker.

12. The method of claim 11 further comprising displaying the plot on a visual display on the tracker.

13. The method of claim 9 further comprising determining the GPS location of the first location and the second location.

14. The method of claim 9 further comprising setting the tracker in analyze mode before measuring the amount of interference at the plurality of different frequencies.

15. The method of claim 9 further comprising determining the second preferred frequency to be the same frequency as the first preferred frequency.

16. An assembly comprising:
a beacon programmed to toggle between emitting a beacon signal at a first preferred frequency and power level at a first location and emitting the beacon signal at a second preferred frequency and power level at a second location below ground along a desired borepath during a horizontal boring operation; and
a tracker for locating the beacon comprising:
a first antenna to detect the beacon signal at a plurality of different frequencies at the first location and subsequently at the second location;
a processor configured to select the first preferred frequency for the beacon to emit the beacon signal at the first location and the second preferred frequency for the beacon to emit the beacon signal at the second location based on the desired borepath, a noise floor for the plurality of different frequencies present at the first location and the second location, and the power level to emit the first preferred frequency and the power level to emit the second preferred frequency; and
wherein the processor is configured to process the beacon signal detected by the antenna to determine a position of the beacon relative to the tracker with the tracker at the first location and to determine a second position of the beacon relative to the tracker with the tracker at the second location.

17. The tracker of claim 16 further comprising a second antenna to detect the beacon signal at the plurality of different frequencies.

18. The tracker of claim 17 further comprising a third antenna to detect the beacon signal at the plurality of different frequencies.

19. The tracker of claim 16 wherein the interference comprises a type and an amount of noise present at each of the plurality of different frequencies.

20. The tracker of claim 16 wherein the first preferred frequency and the second preferred frequency are the same.

21. A horizontal boring system comprising:
a rotary drilling machine;
a drill string having a first end and a second end, the first end being operatively connectable to the rotary machine to drive rotation of the drill string;
a downhole tool connected to the second end of the drill string and comprising a beacon, wherein the beacon is programmed to toggle between emitting a beacon signal at a first preferred frequency at a first location and emitting the beacon signal at a second preferred frequency at a second location below ground along a desired borepath during a horizontal boring operation; and
a tracker for locating the beacon, the tracker comprising:
a first antenna to detect the beacon signal at a plurality of different frequencies at the first location and subsequently at the second location;
a processor configured to select the first preferred frequency for the beacon to emit the beacon si al at the first location and the second preferred frequency for the beacon to emit the beacon signal at the second location based on the desired borepath, a noise floor for the plurality of different frequencies present at the first location and the second location, and a power level to emit the first preferred frequency and a power level to emit the second preferred frequency; and
wherein the processor is configured to process the beacon signal detected by the first antenna and determine a position of the beacon relative to the tracker.

22. The horizontal boring system of claim 21 wherein the tracker is adapted to measure an amount of interference present at each of the plurality of different frequencies at a plurality of locations along a borepath and determine a preferred frequency based on the amount of interference.

23. The horizontal boring system of claim 21 wherein the first preferred frequency and the second preferred frequency are the same.

* * * * *